UNITED STATES PATENT OFFICE.

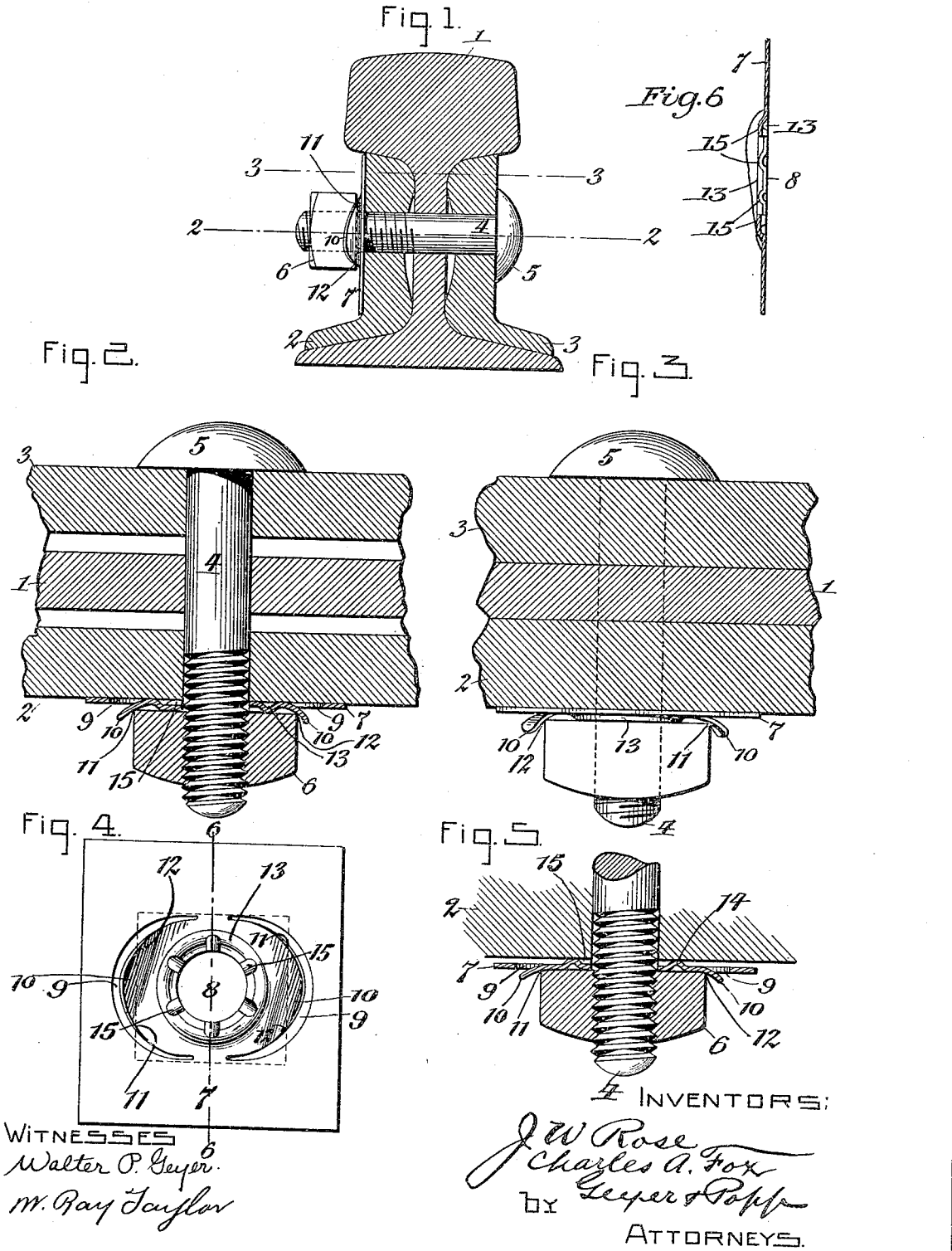

J W ROSE AND CHARLES A. FOX, OF BUFFALO, NEW YORK.

NUT-LOCK.

1,136,486.  Specification of Letters Patent.  Patented Apr. 20, 1915.

Application filed June 11, 1913. Serial No. 773,044.

*To all whom it may concern:*

Be it known that we, J W ROSE and CHARLES A. FOX, citizens of the United States, and residing at Buffalo, in the county of Erie and State of New York, have invented new and useful Improvements in Nut-Locks, of which the following is a specification.

This invention relates to a nut lock which is constructed in the form of a washer having a hole or perforation for the reception of the body of the bolt and an aperture on one or both sides of said hole whereby lips are formed which are curved outwardly and are adapted to engage with a side of the nut of the bolt. A nut lock of this character is shown and described in Letters Patent of the United States #718,838, granted January 20, 1903, and the present invention is an improvement on the nut lock shown in this patent.

The improvements forming the subject of this invention are designed to permit the locking lips of the nut lock to move freely laterally relatively to the body and prevent the same from remaining in an inoperative position on the body so as to insure proper engagement of the locking lips with the nut at all times; also to so construct these lips that the same can be deflected comparatively easy by the nut when turning the same in the direction for tightening the nut but will offer greater resistance to the latter when the same is turned backwardly and thereby more effectually prevent loosening of the nut and relieving the lips from breaking strains; also to provide means whereby the locking lips are spaced apart or separated at the base thereof from one of the coöperating members between which the nut lock is received for the purpose of permitting the base portions of the lips to yield and relieve the outer free portions of these lips from undue pressure and breaking strain when the same are deflected by the turning of the nut; and also to provide the body of the nut lock around the bolt hole with means whereby the inner edge or bore of the bolt hole is prevented from working into the threads of the bolt and the locking device is maintained in its centered position relatively to the bolt, thereby preventing interference with the turning of the nut and bolt one relatively to the other and also insuring proper engagement of the locking lips with the nut.

In the accompanying drawings: Figure 1 is a vertical transverse section of a railway rail and a pair of fish plates secured to opposite sides of the rail by a bolt and nut provided with my improved nut lock. Figs. 2 and 3 are fragmentary horizontal sections, on an enlarged scale, taken in the correspondingly numbered lines in Fig. 1. Fig. 4 is a detached front elevation of my improved nut lock. Fig. 5 is a fragmentary view similar to Fig. 2, showing a slight modification of my invention. Fig. 6 is a vertical section taken on line 6—6, Fig. 4.

Similar characters of reference indicate corresponding parts throughout the several views.

Although my improved nut lock is applicable to nuts and bolts for various uses in which the loosening of the nut should be prevented the same has been shown in the drawings as applied to a bolt and nut whereby two fish plates are secured to opposite sides of a rail.

In these drawings, 1 represents the rail, 2, 3 the fish plates engaging with opposite sides of the rail, 4 the body or shank of the bolt passing transversely through coinciding openings in the web of the rail and the fish plates and bearing with its head 5 against the outer side of one of the fish plates, and 6 a screw nut applied to the opposite threaded end of the bolt shank.

My improved nut lock which is associated with the parts just described for preventing loosening of the nut is constructed as follows: In its preferred form this nut lock is constructed of a single piece or sheet of spring metal, preferably though not necessarily of steel, which forms the body 7 of the nut lock. In its central part the body of the nut lock is provided with a hole or perforation 8, preferably of circular form, which is adapted to receive the shank or body of the bolt. This nut lock is adapted to be placed upon the bolt between the nut and the outer surface of the adjacent member through which the bolt passes so that the body of the nut lock bears frictionally against the said member. On one or both sides of this bolt hole but preferably on both sides, the body of the nut lock, as shown in the drawings, is provided with two curved or crescent-shaped slots 9 having their inner walls arranged adjacent to the bolt hole. The metal bounded by the inner wall of each of these slots forms a detent, retaining or locking lip 10, which is bent outwardly or laterally on a curve relatively to the plane of the body of the nut lock so as to engage with the side of the nut adjacent to the periphery thereof and resist turning of the nut.

In the nut lock of the patent heretofore referred to, the locking lips were formed by slitting the sheet of metal between the body and the locking lips, which is unsatisfactory because these lips when pressed inwardly by the nut upon turning the latter are liable to become caught at their edges by frictional engagement with the opposite edge of the slitted portion of the body with the result that these locking lips would not always follow up the nut and assume their proper position relatively to the nut for preventing or resisting turning of the same. In order to prevent the lips from thus engaging their edges with the adjacent edges of the body the separation between these lips and the body of the nut lock is effected by actually removing a part of the stock of material of the sheet metal blank in forming the slots 9, as shown in Fig. 4, instead of merely slitting the sheet metal between these parts. By this means the edge of each locking lip forming the inner wall of the curved or crescent-shaped slot is separated or spaced apart from the outer edge or wall of this slot on the body which positively prevents these edges from engaging with each other upon pressing the lips inwardly by the action of the rotary movement of the screw nut against the same, thereby leaving these lips always free to constantly spring outwardly due to their resilience and properly engage the peripheral edge portion of the nut for resisting turning of the same.

As shown in Figs. 2 and 3, the locking lips are bent so that the edge portion 11 of each locking lip which is engaged by the advancing part of the nut is curved on a comparatively long radius while the other or opposite edge portion 12 of the lip which is engaged by the backing part of the nut is curved on a shorter radius. The advantage in thus curving one part of the edge of this lip on a greater radius than the opposite edge portion is that the nut can be tightened or screwed forwardly more easily by reason of the more gradual sloping surface of the locking lip with which the advancing part of the nut engages while tightening the nut, but a more abruptly sloping surface of the locking lip is presented to the backing part of the screw nut which operates to offer a greater resistance to the movement of the screw nut in a direction which would unscrew the same or back it off the body of the bolt. It will thus be apparent that by this means the nut can be tightened quickly and with little exertion inasmuch as the locking lips upon tightening the nut can be deflected with comparative ease but these lips offer greater resistance to the reverse movement of the nut and thus insure against loosening of the nut on the bolt. Furthermore, by this construction of the locking lips the same are relieved from strain when engaged by the nut and prevented from being broken.

It has been found in practice that when the locking lips are clamped on opposite sides of their bases between the screw nut and the adjacent surface of the coöperating member through which the bolt passes that the outer part of each lip is comparatively rigid and is liable to be broken by the strain which is exerted by the rotation of the nut over the same during which movement the locking lip is straightened more or less. In order to relieve the locking lips of undue pressure and breaking strains and to obtain greater resilience of each locking lip and permit the same to shift its position and accommodate itself to the surface of the nut without straining the lip, the inner part or base of each lip is held away from at least one of the coöperating members between which the nut lock is placed. In the construction shown in Figs. 2, 3 and 4 this is effected by forming an annular outwardly or forwardly projecting spacing bead 13 on the nut lock body around the bolt hole thereof and preferably concentrically therewith. Upon placing this nut lock between the nut and the adjacent fish plate, the rear side of the base of each locking lip engages frictionally with the adjacent fish plate while the front side of the base of each of these locking lips is spaced apart or held away from the inner side of the screw nut by reason of the spacing bead 13 engaging with the screw nut. That portion of each locking lip at the base thereof is therefore not clamped between the screw nut and the adjacent fish plate and not confined positively, thereby relieving each lip of undue pressure and breaking strains and permitting this portion of the lip to add its resilience to that of the outer free part of the lip which causes the locking lip as a whole to be relieved of strain and to be deflected readily by the rotation of the screw nut without liability of breaking the lip. Instead of forming this spacing bead on the outer or front side of the body of the locking nut the same effect can be produced by forming this spacing bead on the rear or inner side of the body, as shown at 14 in Fig. 5.

Owing to the thin metal from which this nut lock is made the inner edge of the same forming the bore of the bolt hole therein is liable to work into the threads of the bolt and throw the locking device out of center relatively to the bolt so that the lip or lips would not properly engage the nut, and also cramp the bolt, so as to interfere with the proper turning of the nut and bolt relatively to each other. In order to prevent the bolt hole edge of the nut lock from thus working into the threads of the bolt, means are provided which preferably consist of a plurality of radial stop ribs 15 arranged on the body around the bolt hole and forming a thickening of the body at this place which causes the same to bridge the space between the threads of the bolt. These stop ribs are preferably formed on the front side of the body of the nut lock so that they extend radially outward from the bolt hole to the spacing bead by stamping or deflecting the metal of the body forwardly and in this way increasing the width of the body at intervals around the bolt hole. This increased width is greater than the distance between two adjacent screw threads of the bolt, whereby the inner edge or bore of the bolt hole in the nut lock is caused to bridge the threads of the bolt at intervals and the objectionable feature above referred to is avoided. The turning of the nut lock is prevented by engagement of its outer edge either with the head of the rail, the base of the adjacent fish plate or other projection on the rail or fish plate.

This nut lock is exceedingly simple in construction and as the same can be produced from a single sheet of metal by comparatively simple tools the same can be manufactured at very low cost.

We claim as our invention:

1. The combination of a body, a bolt passing through said body and having a nut, and a plate interposed between said body and nut and having a central hole which receives the shank of said bolt, a curved slot on one side of said bolt hole forming a lip which is bent forwardly and engages the rear corners of said nut, and an annular bead formed on the front side of the plate around the bolt hole and engaging with the rear side of said nut.

2. A nut lock comprising a plate having a central bolt hole and a curved slot on one side of said bolt hole and forming a lip which is bent laterally and adapted to engage the side of a nut and said plate being provided on one of its sides between its hole and slot and at a distance from both of these with a laterally projecting bead which is adapted to engage with a coöperating member.

3. A nut lock comprising a plate having a central bolt hole and a curved slot on one side of said bolt hole and forming a lip which is bent laterally and adapted to engage the side of a nut and said plate being provided at its bolt hole with a radial stop bead for preventing the plate from working into the threads of the bolt.

4. A nut lock comprising a plate having a central bolt hole and a curved slot on one side of said bolt hole and forming a lip which is bent laterally and adapted to engage the side of a nut, said plate being also provided around its hole with a laterally projecting annular spacing bead and with a plurality of radial stop ribs extending from the bore of said hole outwardly.

5. A nut lock comprising a plate having a central bolt hole and a curved slot on one side of said bolt hole and forming a lip which is bent laterally and adapted to engage the side of a nut, a portion of the stock of said plate being removed in the formation of said slot so that the opposite walls of the slot are separated by an intervening clear space or gap, the curvature of that part of said lip which is engaged by the advancing side of the nut being of a greater radius than that part of said lip which is engaged by the backing side of said nut, said plate being also provided around its hole with a laterally projecting annular spacing bead and with a plurality of radial stop ribs extending from the bore of said hole outwardly.

Witness our hands this 3rd day of June, 1913.

J W ROSE.
CHARLES A. FOX.

Witnesses:
THEO. L. POPP,
WALTER P. GEYER.

Copies of this patent may be obtained for five cents each, by addressing the "Commissioner of Patents, Washington, D. C."